Aug. 11, 1925.

T. F. BOWLER

WHEEL 1,549,057

Filed July 22, 1924

Inventor
T. F. Bowler

By R. T. Bassett
Attorney

Patented Aug. 11, 1925.

1,549,057

UNITED STATES PATENT OFFICE.

THOMAS F. BOWLER, OF BOISE, IDAHO.

WHEEL.

Application filed July 22, 1924. Serial No. 727,483.

*To all whom it may concern:*

Be it known that I, THOMAS F. BOWLER, a citizen of the United States, residing at Boise, Ada County, State of Idaho, have invented a certain new and useful Improvement in Wheels, of which the following is a specification.

This invention relates to improvements in wheels and more particularly to improved means for detachably securing a tire rim to a wheel felly.

It is well known that the tire rims of automobiles must be frequently removed from the wheel in order to repair a punctured tire, and various structures have been provided to facilitate the ready removal of the rim. It is the primary object of the present invention to provide improved means for detachably securing the tire rim to the wheel felly.

Another object of the invention is to furnish a tire rim which may be readily attached to either a right or left wheel felly, and which may be securely locked to either felly.

Another object is to provide a rim which will tend to automatically tighten itself on the wheel felly as the vehicle moves forwardly, the construction being such that the locking means will automatically adjust itself to accommodate the shifting of the rim due to the forward movement of the wheel.

With the foregoing objects outlined and with other objects in view which will appear as the description proceeds, the invention consists in the novel features hereinafter described in detail, illustrated in the accompanying drawing and more particularly pointed out in the appended claims.

Referring to the drawing.

Figure 1:
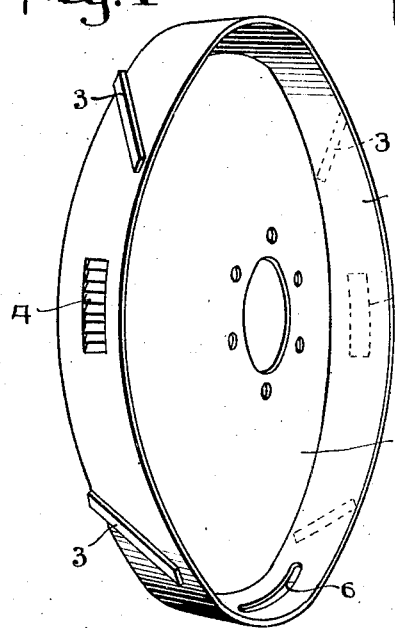
Fig. 1 is a perspective view of a wheel of the disk type with my improved felly band attached thereto.
Figure 2:
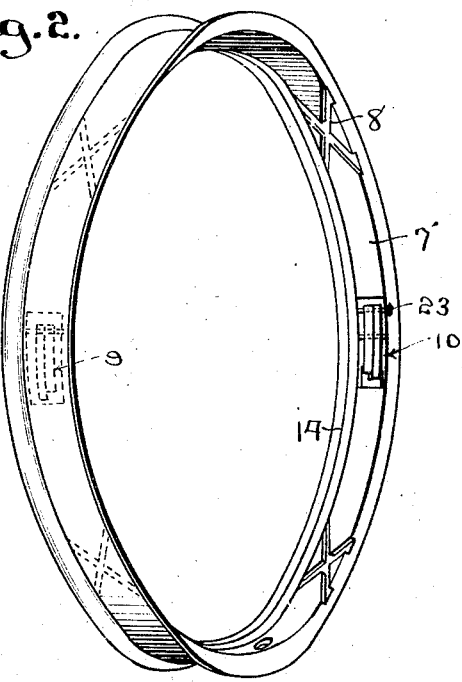
Fig. 2 is a similar view of the improved rim for use with the felly.

In the drawing, 1 designates a wheel provided with a cylindrical felly band 2 having diagonally arranged lugs 3 on its periphery. All of these lugs extend in the same direction and they reach substantially from one edge of the felly band to the opposite edge of the latter. These lugs on the right hand wheels will extend in a direction opposite to the lugs on the left hand wheels.

The band is provided at diametrically opposite points with segmental racks 4 and 5 and the band is split circumferentially to provide a slot 6 through which the valve stem of a tire may extend.

Figure 3:
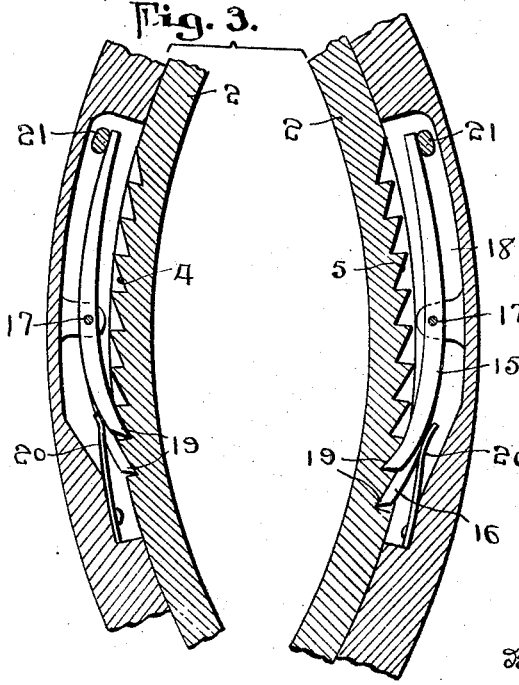
Fig. 3 is a sectional view of diametrically opposite points of the felly band and rim, and showing the novel means for locking the rim on the felly band.
Figure 4:
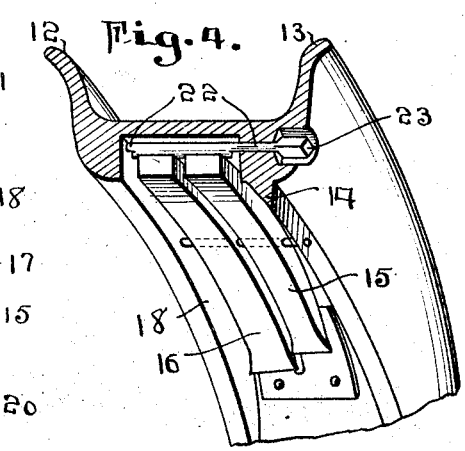
Fig. 4 is a transverse sectional view of the rim and illustrating one of the locking devices for the rim.

The novel rim employed with this felly band, preferably has a cylindrical inner surface 7 interrupted at four points, arranged at 90 degrees relatively to one another, by X-shaped grooves 8, and this surface is also interrupted at diametrically opposite points by locking devices 9 and 10. A hole 11 in the rim cooperates with the slot 6 to permit the passage of the tire valve. As best shown in Fig. 4, the periphery of the rim is provided with outwardly extending flanges 12 and 13 to receive the tire beads. The lugs 3 on the felly band are of such size that they readily fit in either straight portion of either of the X-shaped grooves 8, so it may be seen that when the grooves of the rim are lined with the four lugs 3 of the felly band, the rim may be turned relatively to the wheel and then the grooves will slide along the lugs 3 so as to bring the outer ends of the lugs against the inwardly extending flange 14 of the rim. Fig. 1 shows a right wheel, and if we assume that the rim is placed on the felly band of this wheel, the wheel in moving forwardly will turn in a clockwise direction so that the rim will tend to ride circumferentially in a clockwise direction on the felly band, and consequently the rim will always tend to tighten itself as the vehicle moves forwardly. To secure the rim on the wheel, each of the locking devices consists of a plurality of pawls 15 and 16 pivotally mounted on a cross pin 17 arranged in a recess 18 in the rim. From Fig. 3 it may be seen that the pawls 15 and 16 at opposite sides of the rim, have their pointed ends 19 extending toward one another, so that they may bite into the teeth of the racks 4 and 5. The teeth of the rack 4 extend in a direction opposite to the teeth of the rack 5, so that one rack and its cooperating pawls locks the rim against movement in one direction and the other rack and its cooperating pawl locks the rim against movement in the opposite direction.

Leaf springs 20 are fixed in the recess 18 and bear against the pointed ends 19 of the pawls for forcing the same toward the axis of the rim, and cams 21 are employed to force the pawls into inactive position. As best shown in Fig. 4 each cam has cylindrical ends 22 rotatably mounted in the rim at opposite sides of the recess 18 and each cam has one end extended to the outer side of the rim and provided with a square head 23 to receive an operating key.

As before stated, the rim has the cross shaped grooves 8, so that the rims of all four wheels are uniform, and either of these rims may fit the right or left wheels, as the grooves 8 will cooperate with the lugs 3 whether these lugs extend in a clockwise direction from right to left or in an anticlockwise direction from left to right. The rack 4 and its cooperating pawls will function to lock the rim against rotation in one direction, when the rim is used with a left hand wheel, and the rack 5 and its cooperating teeth will function to lock the rim against rotation in one direction, say on a left hand wheel. If both pawls are permitted to operate, as shown in Fig. 3 they will prevent the rim from rotating in either direction relatively to the felly. When it is necessary to remove the rim, a key may be attached to the head 23 and the cam may be given a quarter turn to rock the pawls and cause them to release the teeth with which they were interlocked. Then the rim may be turned in the proper direction to slide the grooves off of the lugs 3.

From the foregoing it is believed that the construction, operation and advantages of the invention may be readily understood, and it is apparent that changes may be made in the details disclosed without departing from the spirit of the invention as expressed in the claims.

What I claim and desire to secure by Letters-Patent is:

1. In a motor vehicle wheel, a rim member provided at spaced points with cross-shaped grooves adapted to receive diagonal lugs on a felly band member, and means for locking the rim member to a wheel.

2. In a motor vehicle wheel, a band member provided at spaced points with cross-shaped grooves adapted to receive diagonal lugs on a wheel member at either side of the vehicle, and means for locking said band member against rotation relatively to the wheel member on which it may be mounted.

3. In a motor vehicle wheel, in combination a felly band member and a rim member, one of said members being provided at spaced points with diagonally arranged lugs of a length substantially equal to the width of the last mentioned member, the other member having grooves of substantially the same length as the lugs to receive the latter, and cooperating locking means on said members to lock the rim member against rotation in either direction relatively to the felly member.

4. In a motor vehicle wheel, a felly band provided at spaced points with diagonally disposed lugs, each reaching substantially from one side edge of the band to its opposite edge, a rim provided at its inner side at spaced points with diagonal grooves to receive said lugs and hold the rim on the felly band, and locking devices on the felly band and rim to prevent the rim from rotating in either direction relatively to the felly band.

5. In combination, a felly band member and a rim member surrounding the latter, one of said members being provided with a segmental rack, the other member being provided with pivotally mounted pawls engageable with the teeth of the rack, a cam engaging said pawls for disconnecting the same from the teeth, said cam having an end projecting to the exterior of the wheel to receive an operating member.

In testimony whereof I hereunto affix my signature.

THOMAS F. BOWLER.